Feb. 3, 1948.   M. D. MANN, JR   2,435,228
POLYMERIZATION APPARATUS
Filed Dec. 7, 1940   7 Sheets-Sheet 1

Matthew D. Mann Jr. Inventor
By Ph. Young Attorney

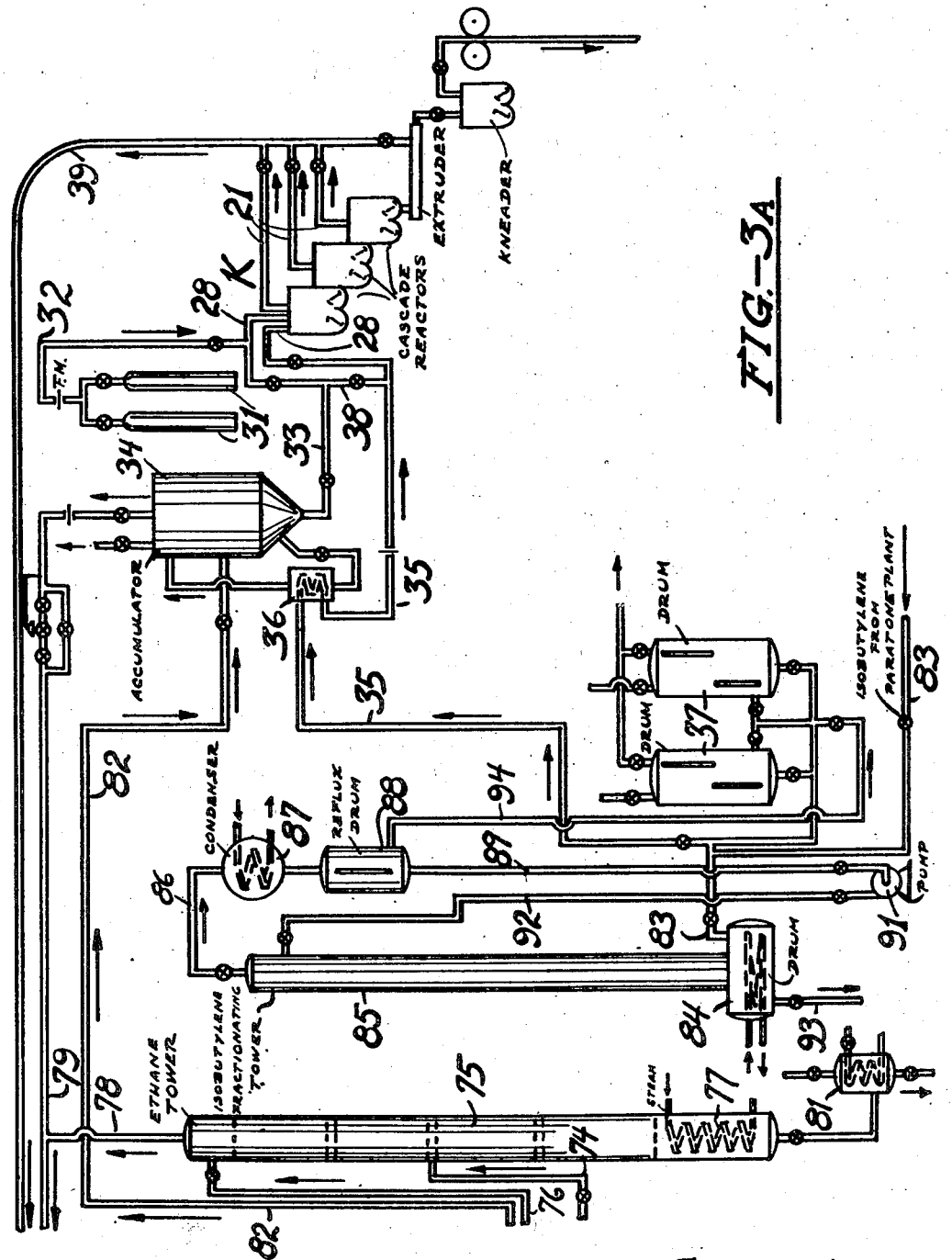

Patented Feb. 3, 1948

2,435,228

UNITED STATES PATENT OFFICE 2,435,228

POLYMERIZATION APPARATUS

Matthew D. Mann, Jr., Cranford, N. J., assignor, by mesne assignments, to Jasco, Incorporated, a corporation of Louisiana Application December 7, 1940, Serial No. 368,967

7 Claims. (Cl. 23—285)

This invention relates to processes and apparatus for the low temperature polymerization of olefinic substances; relates particularly to continuous low temperature polymerization processes in which portions of the materials are recycled; and relates especially to means for separating the polymer from the recycle stream without loss of recycle material; and further relates to means for the reduction of fire and industrial poisoning hazard otherwise inherent in unconfined hydrocarbon vapors.

Isobutylene and mixtures containing isobutylene polymerize readily at low temperatures in the presence of an active halide catalyst into very high molecular weight plastic, elastic, rubber-like substances. This polymerization reaction is conveniently conducted at temperatures ranging from —10° C. to —100° C. or even lower, preferably within the temperature range of —40° C. to —80° C.; the reaction mixture preferably contains as the major polymerizable constituent, an isoolefin such as isobutylene. It may contain in addition substantial portions of other olefins, diolefins, diluents, refrigerants, olefins, etc. Various low boiling liquids such as liquid propane, liquid ethylene, or liquid ethane are preferably used as refrigerants; and various diluents such as propyl, ethyl or methyl chloride, and other similar substances are also useful. The polymerization may be conducted in batch operation, but great difficulty is encountered in recovering the various refrigerants, diluents and unpolymerized reactants, since most of them are gases at room temperature, and even at temperatures only slightly above the reaction temperature. These characteristics of the substances making up the reaction mixture, together with the solid character of the polymeric product, makes it exceedingly difficult to separate the polymer from the reaction mixture without the loss of undesirable large portions of the gaseous diluent-refrigerant and the development of a serious fire hazard and industrial poisoning hazard which otherwise arises when substantial quantities of gaseous hydrocarbons are freed in a room. Such hydrocarbons yield combustible or explosive mixtures with air, when more than a very small percentage of the hydrocarbon is present, and at concentrations below the explosive or combustible range, they may still cause serious hazard of industrial poisoning.

The present invention provides a new polymerization process, and a new type of reactor with means for the separation and recovery of the solid polymer and the volatilized gaseous portions of the reactant mixture, substantially without loss of any of the volatilized diluent-refrigerant or reactant substances; thereby avoiding the loss of valuable materials and, in addition, avoiding the development of fire or industrial poisoning hazard.

Broadly, the apparatus of the invention consists of a reaction vessel in combination with a screw-type extruder. The reaction vessel may be a portion of the extruder mechanism, with the extruder screws operating directly in the polymerizable mixture; or the reactor vessel may be a container adjacent to and associated with the extruder member, the reactor vessel preferably containing means for transferring the solid polymer to the extruder; or the reactor vessel may consist of a plurality of members arranged in cascade, each with means for transferring the polymer from one chamber to the next. The extruder may be jacketed with a coolant to maintain the desired low reaction temperature, if the polymerization occurs in a portion of the extruder, with the solid polymer being consolidated and ejected by the extruder screws. Alternatively, and preferably, if the polymerization is conducted in an adjacent, associated reaction vessel and the solid polymer is transferred from the reaction vessel to the extruder, the extruder is preferably equipped with a heating means such as a steam jacket, in order to volatilize from the solid polymer, any residual traces of the various components of the reaction mixture, and to condition the solid polymer for easier extrusion. When the reaction is conducted in an adjacent, cooperating reaction chamber, either a single reaction chamber, or a plurality of reaction chambers, they are desirably heat insulated, and may conveniently be jacketed with coolant, as previously described, for the extruder, when the reaction occurs in the extruder.

The extruder and the reaction vessels, if such are used, are preferab.y tightly closed with solid covers, and are provided with supply pipelines for the delivery of the various component parts of the reaction mixture to the reactor, and are further provided with discharge lines for the transfer of volatilized portions of the mixture to recycle equipment in which the mixed gases are fractionated, cooled and condensed for reuse as portions of a further quantity of reaction mixture.

Thus an object of the invention is to polymerize an olefinic material continuously, while continuously removing from the polymerization container the solid polymer, and recovering substantially all of the volatilized reaction mixture components for reuse and recycling, while avoiding the development of fire hazard or industrial poisoning hazard, by the association with the reaction container of an extruder mechanism which ejects only the solid polymer from the reaction mixture. Other objects and details of the invention will be apparent from the following description when read in connection with the accompanying drawings; wherein Fig. 1 is a side view in elevation of an embodiment of the polymerization reactor of the invention;

Fig. 2 is a side view in sectional elevation of the embodiment of Fig. 1;

Figs. 3 and 3A together show the flow of materials for the polymerization reaction and the recovery of the volatilized materials and the solid polymer;

This application is a continuation-in-part of my co-pending application Serial No. 684,813, filed August 12, 1933, which has matured into Patent No. 2,229,661.

A convenient embodiment of the invention consists of a cascade of "Werner and Pfleiderer" type of kneader in combination with a screw-type extruder, the whole structure being closed gas-tight, with sealed covers, and having ports for the discharge of solid polymer and reaction mixture from one kneader to the next, and supply lines for the various components of the reaction mixture, discharge lines for the removal of the vaporized constituents, and the extruder outlet for the discharge of the solid polymer. The reaction mix components are preferably delivered through pipes to the first, uppermost kneader, and the polymerization initiated therein. The polymerization reaction liberates relatively very large quantities of heat, which quantities are absorbed by the diluent-refrigerant, usual liquid ethane or liquid ethylene present in the reaction mixture. The reaction is rapid and the heat of reaction volatilizes a major portion of the diluent-refrigerant to practically all of the diluent-refrigerant. During the reaction, practically all of the isobutylene is converted into the solid polymer which is transferred by the kneader blades into the next adjacent kneader device in the cascade sequence. In this second kneader, and to some extent in the first kneader as well, the solid polymer is cut and broken into relatively small granules or crumbs, and residual quantities of the diluent-refrigerant and any unpolymerized reactants are largely driven off from the solid polymer. The breaking up and degassing may be continued in a third kneader to which the solid polymer is transferred by the blades of the second kneader, and at the conclusion of treatment in the third kneader, the material is delivered into a heated extruder, in which substantially all of the diluent-refrigerant, catalyst, and any other volatile materials are volatilized from the solid polymer, under a plenum of low gas pressure, and the solid polymer is discharged through the extruder nozzle as a solid stream which seals the discharge from the reactors against leakage of volatilized gas; thereby avoiding the loss and wastage of valuable materials; avoiding the development of a fire hazard from admixture of these hydrocarbon gases with air, and avoiding the development of an industrial poisoning hazard, since most of these substances have anaesthetic and poisonous properties; and, in addition, permitting of the return of the volatilized gaseous materials to appropriate purifying and condensing devices for re-use in the preparation of further portions of polymer.

Figure 2:
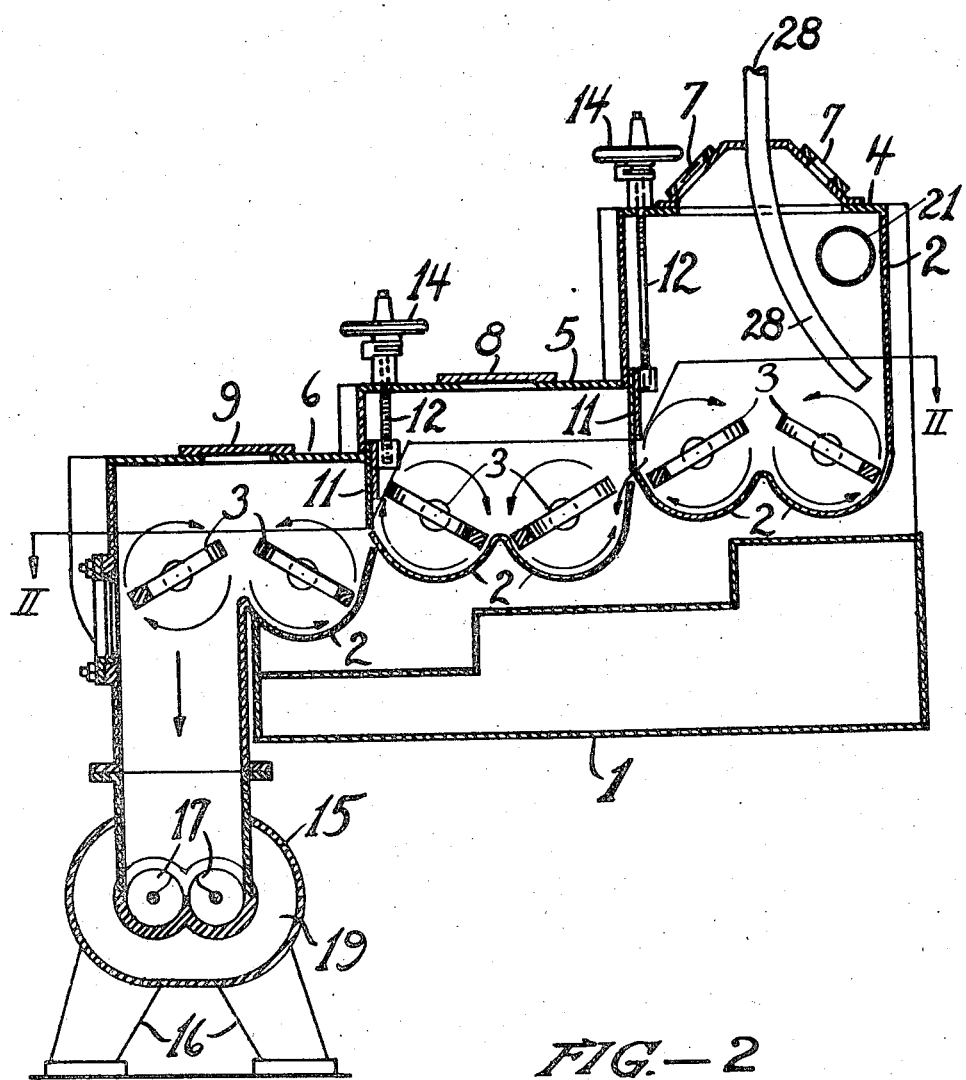

Referring to the figures, a base plate member 1 is provided, upon which the frame members 2 of the reactors are mounted. As is particularly well shown in Fig. 2, the frame members 2 form the sides, ends and bottoms of a series of kneader-mixers in which there are located S type kneading and mixing blades 3. These blades 3 operate in pairs, as shown, and each pair of blades has its own frame and housing as is shown in the drawings. The respective housings are covered and closed by covers 4, 5 and 6, respectively, equipped with sight glasses or inspection windows 7, 8 and 9. Each housing, except the last, is equipped with a discharge opening controlled by an adjustable gate 11, which is moved up and down by a threaded rod 12 controlled by a hand wheel and nut assembly 14. The last kneader of the cascade series has a discharge opening beneath the second of the kneader blades 3 which leads to an extruder device 15 mounted upon legs 16 and having extruder screws 17 terminating at a discharge outlet 18 through which the solid polymer is discharged. The extruder 15 has a steam jacket 19 by which the polymer discharged from the last blade 3 onto the extruder screws 17 is rapidly warmed up and any residual polymer raw material or diluent-refrigerant is rapidly volatilized and sent backward in countercurrent direction through the successive kneader devices to a gas discharge port 21 which leads to the recovery and recycling apparatus.

Figure 5:
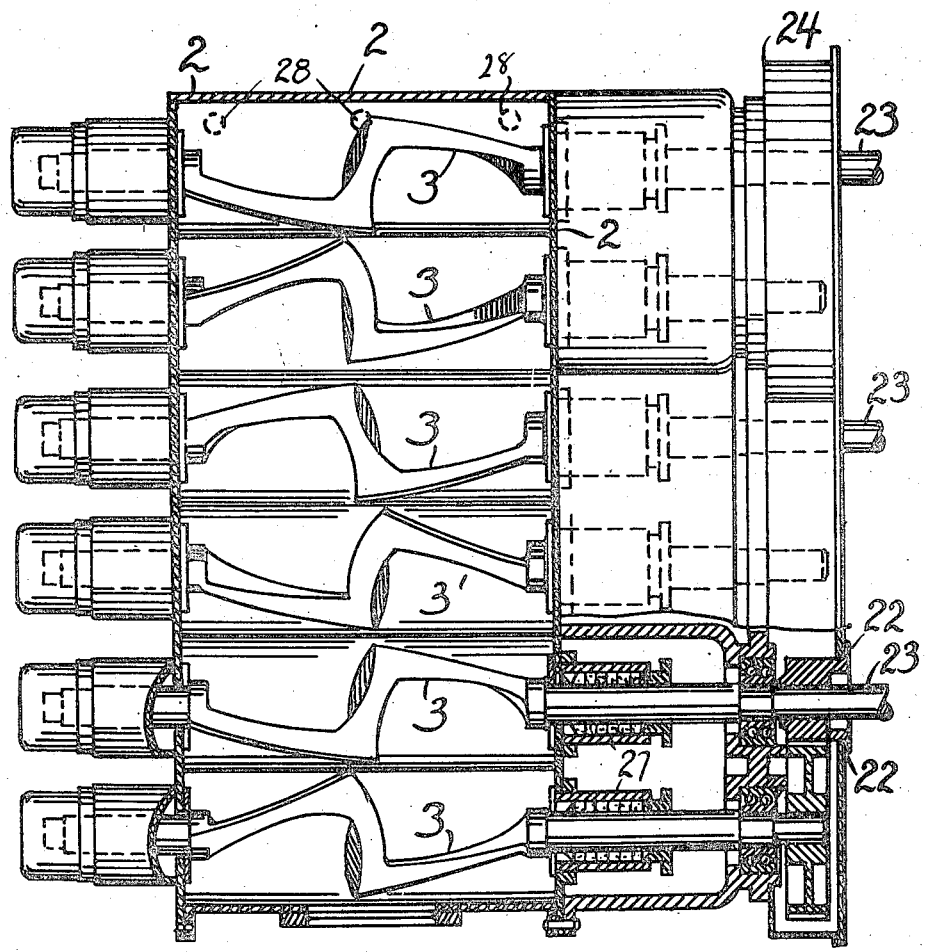
Fig. 5 is a top view of the embodiment of Fig. 1.

The respective pairs of kneader blades 3 are driven in opposite directions by gear members 22, which preferably drive the respective blades 3 of each pair at a 2 to 1 speed ratio. Each pair of blades is preferably driven by a suitable power source applied to the respective shafts 23. This power source may conveniently be individual electric motors (not shown). The gears 22 are desirably shielded and protected by a gear case 24. The respective extruded worms are driven through gears 25 by power from a convenient source supplied through the shaft 26. The respective shafts are desirably equipped with efficient packing glands 27 as shown in Fig. 5 in order to prevent leakage of the polymerization mixture, as well as vaporized portions of the reactant mix resulting from the high heat of reaction of the polymerization from the kneader chambers.

The various components of the polymerization mixture are preferably delivered to the first of the kneaders through delivery pipe lines 28 which are desirably extended inside of the first kneader chamber to a point as close to the first of the kneader blades 3 as possible. The ends of the respective pipes 28 are preferably brought close together, in order to discharge the two streams of reactants and catalyst into the same neighborhood in order to promote as rapid mixing as possible.

The cascade kneader system may be equipped with a single gas outlet 21 as shown, or each of the successive kneader sets may be equipped with separate gas outlets 21.

Figure 3:
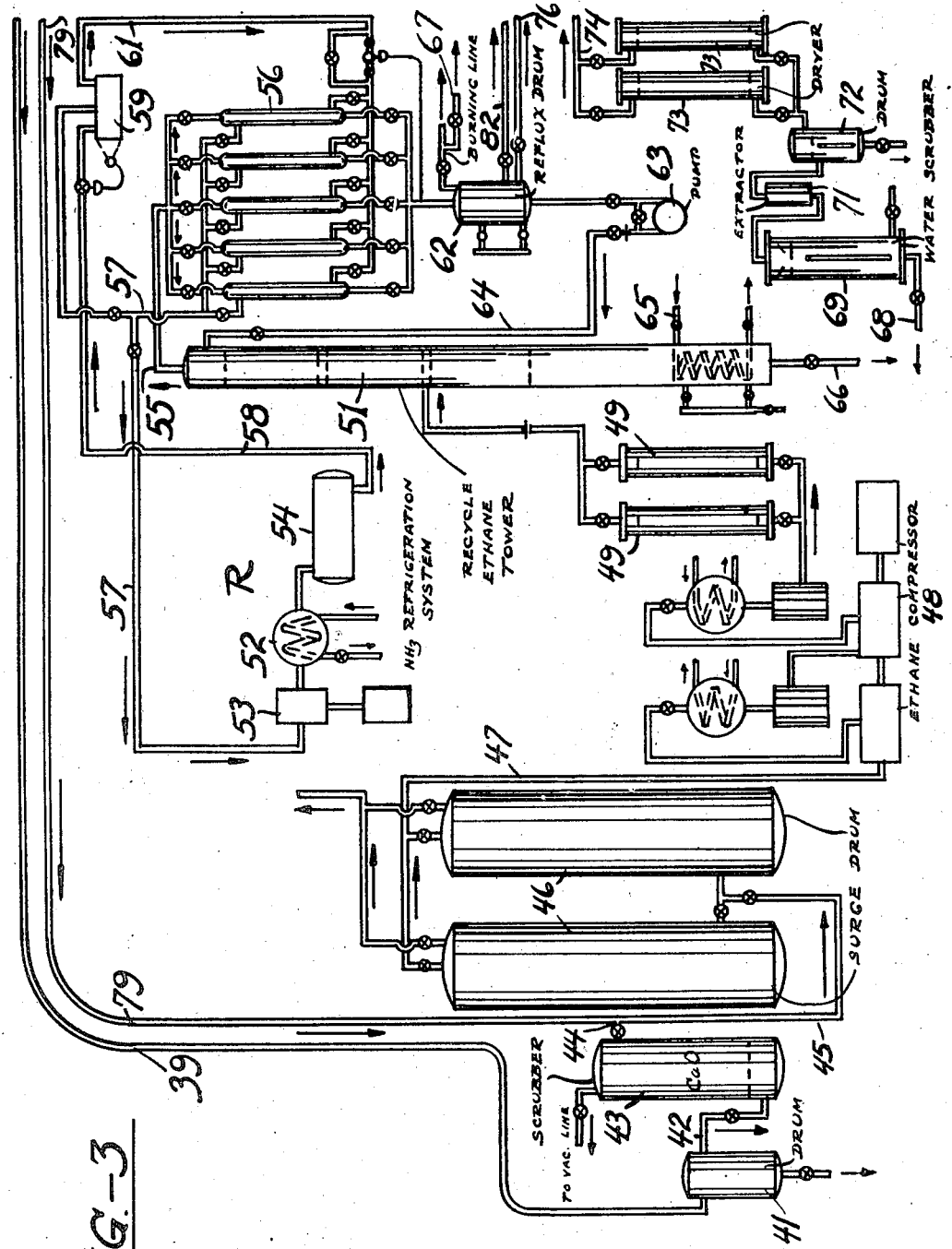
Figure 4:
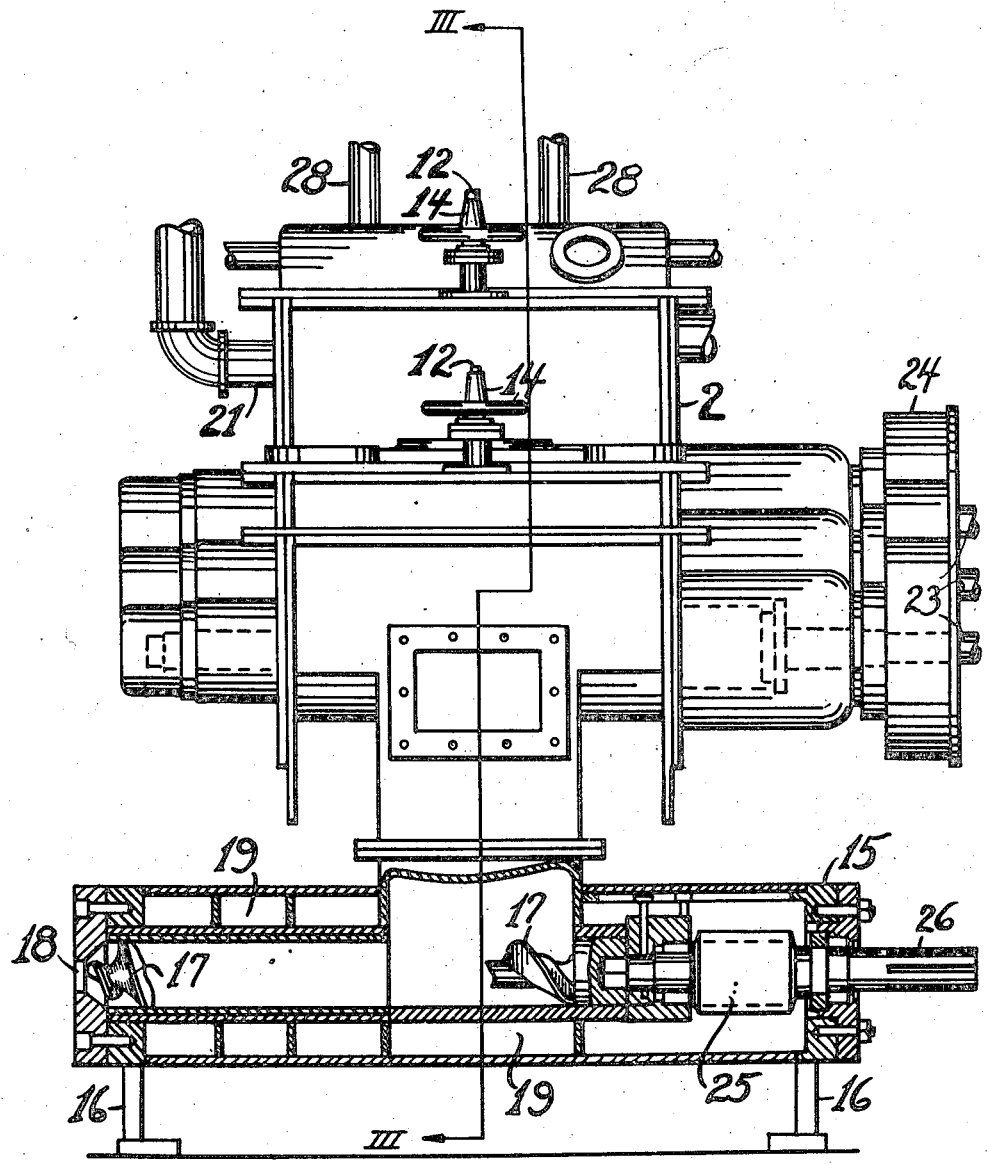
Fig. 4 is an end view, partly in section of the embodiment of Fig. 1.

Referring to Figs. 3 and 3A, the kneader system K, shown at the right of Fig. 3A with the gas outlet pipes 21, and the supply pipes 28, is connected to a source of boron trifluoride in the form of cylinders of the liquefied gas 31 which are connected through a pipe and valve system 32 to one of the supply pipes 28, which is also connected by a supply pipe 33 to a storage reservoir 34 containing a supply of liquid diluent-refrigerant, preferably liquid ethylene. A second of the supply pipes 28 is connected by way of supply pipe 35 and cooler 36 to storage drums 37 containing liquid isobutylene. A by-pass supply pipe line 38 with control valve as indicated leads from the pipe 33 to the pipe 35 for the delivery of liquid diluent-refrigerant to mix with the liquid isobutylene preparatory to delivery into the kneader system K. The gas outlet pipes 21 are connected to a transfer pipe line 39 which leads, as shown in Fig. 3, to a scrubber drum 41 for the removal of any liquid constituents. From the drum 41 a second pipe line 42 leads to a scrubber device 43 which consists of a closed container charged with calcium oxide which serves to remove from the effluent any residual traces of boron trifluoride. From this drum 43, the ethylene vapor is discharged through pipe lines 44 and 45 to storage or surge drum 46. From the drums 46 a pipe line 47 leads the effluent, which is largely gaseous ethylene free from boron trifluoride but contains small quantities of isobutylene, and on occasion small quantities of isobutylene dimer and trimer (and if diolefins are used in the reaction mixture, may contain small quantities of the diolefins), to a compressor system 48 in which the gas is compressed and cooled preparatory to liquefaction. The compressed gas is passed through purifying towers 49 containing solid calcium chloride for the removal of all traces of moisture, to a fractionating column 51. The fractionating column 51 operates under a substantial pressure, preferably in the neighborhood of 400 lbs. per square inch.

There is associated with the tower 51 a reflux condenser system R consisting of a condenser member 52, preferably cooled by ammonia refrigeration, together with a circulating pump 53 and a storage drum 54. The relatively pure ethylene leaves the column 51 by way of a pipe line 55, which is associated with a series of storage containers 56. A second pipe line 57 is connected to the pipe line 55 through the pipe manifold shown, and is further connected through a control valve to the pump 53, the condenser 52 and the storage tank 54. A pipe line 58 leaves from the storage drum 54 to an auxiliary flow drum 59 and a delivery pipe line 61 to the lower pipe manifold system shown associated with the storage drums 56. Liquid ethylene condenser under the operating pressure in the condenser 52 is thereby delivered to a storage drum 62 from which a portion is removed by the pump 63 and sent by way of pipe line 64 to the top of the fractionating column 51 to provide the necessary liquid reflux. A steam coil 65 vaporizes a portion of the reflux at the bottom of the fractionating tower 51, and a portion of the heavy ends is discharged through an outlet pipe 66 from which it may be sent to the waste gas lines. Another portion of the ethylene, including any traces of hydrogen, or other more difficultly condensable gases may be discharged through the pipe line 67 to a burning line or to the waste gas line as desired.

A supply of impure ethylene (from the refinery fractionating column) in the form of a C₂ cut is received through pipe line 68, passed through a water scrubber 69, through a vapor extractor 71 through a knock-out drum 72 to drier cylinders 73 which are filled with solid calcium chloride to remove all traces of moisture. From the drier drum 73 the raw ethylene is passed through a pipe line 74 to the ethane tower 75. A substantial portion of cold liquid purified ethylene is delivered from the storage drum 62 by way of the supply pipe line 76 to the top of the ethane tower 75 to form a reflux. A steam coil 77 is provided in the bottom of the tower 75 to vaporize a portion of the reflux. By this arrangement, substantially pure ethylene (with small quantities only of ethane) is delivered through the pipe line 78 to the pipe line 79 leading to the pipe line 45 and the ethylene storage drums 46. The heavy ends from the tower 75 are delivered to a flash drum 81 containing a steam coil which converts the liquid material into gas at approximately room temperature, for return to the refinery fuel lines (to avoid the development of low temperatures which would freeze up the lines). Simultaneously, a major portion of the liquid ethylene is delivered from the storage drum 62 through a pipe line 82 to the storage drum 34 for use in the polymerization reaction.

The nearly pure isobutylene is delivered from the refinery through pipe line 83 to the drum 84 of a fractionating column 85. The nearly pure isobutylene is received from the refinery at approximately atmospheric temperature under a pressure of 40 to 50 pounds, depending on the atmospheric temperature. A portion of the isobutylene is volatilized in the drum 84 and rises through the fractionating column 85 to the pipe line 86 by which it is conducted to condenser 87 where it is condensed and delivered to a reflux drum 88. From the reflux drum 88, a portion of the liquid isobutylene is taken from pipe 89 under the drive of a pump 91 and a second pipe line 92 to a point near the top of the tower 85 to provide the necessary reflux. The heavy ends are discharged through a pipe 93 from the drum 84 to storage or to a flash drum or to other convenient means for disposal. Another portion of the liquid isobutylene is taken from the drum 88 through pipe line 94 to the storage drums 97 in which the liquid isobutylene is stored, and from which it is delivered from the pipe 35 to the polymerization reactor K as above described.

In the operation of the invention, liquid ethylene is withdrawn from the tank 34 through the pipes 33 and 28 into the reactor and allowed to volatilize therein until the entire reactor structure is cooled down to the desired low reaction temperature. During this cooling operation, the volatilized gas is discharged through the pipe 21 to the storage drum 41 and through the scrubber 43 to the drums 46. When the desired low temperature is reached, a further portion of the liquid ethylene is passed through the pipe 38 into the second pipe 28, and thereafter liquid isobutylene from the drums 37 is passed through the pipe 35 and the cooler 36 to the second pipe 28 and discharged into the reactor 2 adjacent the first of the kneader blades 3. Simultaneously with the delivery of the isobutylene-ethylene mixture to the reactor, boron trifluoride is delivered through the line 32 and mixed with and dissolved in the liquid ethylene from pipe 33. By this procedure there is thus discharged through the two pipes 28, simultaneous streams of isobutylene dissolved in liquid ethylene and boron trifluoride dissolved in liquid ethylene.

The polymerization reaction is a very rapid one, liberating a very substantial amount of heat of reaction, and thereby volatilizing the diluent-refrigerant at a relatively high rate of speed. The reaction is complete in a time interval varying from a few seconds to a very small number of minutes and accordingly, while a pool of the reactants is formed by the streams of material in the bottom of the reaction chamber, the reaction is so rapid that the contents of the reaction chamber (the first kneader in the above outlined embodiments) consists mainly of the solid polymer with only very small amounts to negligible amounts of liquid remaining, and small amounts of liquid adhering to, and occluded in, the solid polymer. The kneader blades 3 in the first kneader throw the solid polymer through the gate 11 into the second kneader where a small amount of additional polymerization may occur, but in which the main procedure is the pulverizing and breaking up of the mass of polymer into moderately small granules and the freeing of the polymer from most of the occluded and adhering liquid, the liquid being volatilized and discharged from the kneaders. The action of the kneader blades throws the solid polymer through the second gate 11 into the third kneader, from which it passes downward to the extruder screw 17.

At this stage, the polymerization is complete, and nearly all of the volatilizable material has been removed from the polymer. The extruder screws 17 are provided with a steam jacket 19 and the solid polymer, in contact with the screws 17, is rapidly brought up to a much higher temperature, at which it is greatly softened, and all residual traces of volatilizable matter are rapidly driven out.

The solid polymer is caught by the extruder screws 17 and carried toward the discharge end of the extruder. The extruder screws run at a good speed, and the solid polymer is passed rapidly toward the discharge end of the extruder. As long as a substantail quantity of polymer is in contact with the extruder screws, it is pushed to, and through, the outlet. Simultaneously, the solid polymer is compacted at the discharge end into a solid mass filling the entire discharge nozzle, with all of the gaseous and gasified material derived from unpolymerized raw material and from the diluent-refrigerant or other sources, squeezed out of the solid. Under these circumstances, an impervious plug of solid, but somewhat plastic, polymer fills the discharge outlet of the kneader and prevents the loss or leakage of any gaseous material, thereby sealing the discharge end of the system against the loss of valuable materials and sealing the system against emergence of vapors which could produce either a fire hazard or an industrial poison hazard, yet permitting the simple and easy discharge of solid polymer product as rapidly as it is produced, after a series of purification steps to remove substantially all of the undesired and undesirable volatile material.

Thus the polymerization occurs very rapidly in the first kneader, and the reaction is so rapid that little or no pool of reactant materials occurs in the kneader, but the contents of the kneader are mainly solid polymer with a smaller quantity of actively polymerizing liquid reactors. By the time the solid material is broken up and discharged from the first kneader, the reaction is almost entirely complete, and only a small amount of polymerization reaction or negligible amounts of polymerization reaction occur in the second kneader. In the second kneader, the principal processing consists of breaking and pulverizing all the solid polymer, together with a freeing of the polymer from residual traces of adsorbed or adherent liquid. This breaking up and freeing is continued in the third kneader, completed in the extruder and the polymer plasticized and compacted in the extruder and ejected therefrom.

The emergent gases from the pipe or pipes 21 consist mainly of gaseous ethylene, but contain smaller quantities of gaseous isobutylene, still smaller quantities of boron trifluoride, and may in some instances contain some traces of isobutylene dimer or trimer, or both. The gaseous effluent is passed to the separatory drum 41 and the calcium oxide scrubber as shown in Fig. 3, where any traces of dimer or trimer and boron trifluoride are removed, leaving substantially only ethylene with minor traces of isobutylene. The ethylene is compressed, purified by fractionation as shown in Figs. 3 and 3A, and is delivered to the storage drum 34 for reuse in the process.

The composition of the reaction mixture, previously mentioned, is subject to considerable variation. A preferred form for the making of the simple polyisobutylene consists of approximately one part by weight of liquid isobutylene with two and one-half to three parts by weight of ethylene, together with from 0.001 part by weight to 0.01 part of boron trifluoride as catalyst. That is, the amount of diluent refrigerant required to absorb the heat of polymerization is from two and one-half to three times the amount of isobutylene present, and the amount of catalyst required ranges from one-tenth of one per cent by weight of the amount of isobutylene to one per cent by weight of the amount of isobutylene present.

When liquid ethane is used, approximately the same proportions of reactants are satisfactory. When liquid propane is used, approximately the same proportions of reactants are likewise satisfactory.

In the above paragraphs, it has been suggested that a simple mixture containing isobutylene only as a reactant mixture may be used. It is possible, however, to use a considerable number of other mixtures. For instance, the isobutylene may be replaced by methyl, ethyl ethylene as the reactant, and more than one olefinic substance may be present as a reactant. Especially there may be used diolefinic constituents such as butadiene, isoprene, cyclopentadiene and dimethyl-butadiene, as well as various other diolefinic substances. Likewise, other catalysts than boron fluoride may be used, such as, for instance, aluminum chloride dissolved in a simple solution in a low freezing solvent which does not form a complex with the aluminum chloride, such as ethyl or methyl chloride or carbon dioxide.

Figure 6:
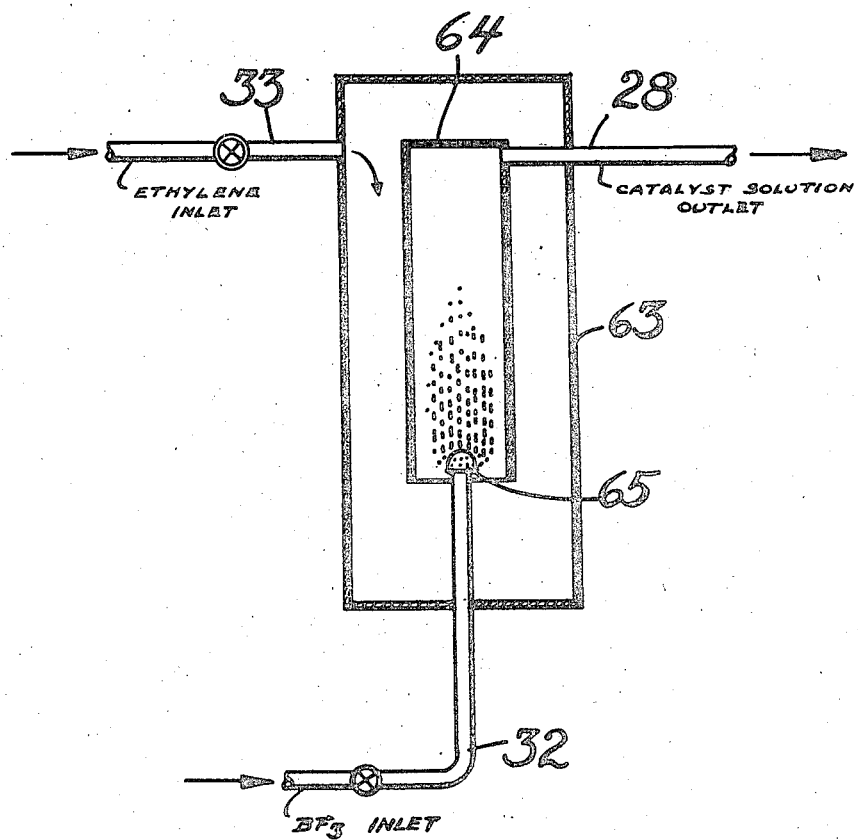
Fig. 6 is a sectional view in vertical elevation of the catalyst dissolving member.

In preparing the respective components of the reaction mixture, the liquid isobutylene and the liquid ethylene may simply be mixed, preferably at the temperature set by the boiling point under atmospheric pressure of the ethylene since the isobutylene (and any other added olefinic materials) are readily soluble in the ethylene which serves as the diluent-refrigerant. In preparing the solution of catalyst, however, it is desirable that the gaseous boron trifluoride be dissolved in a portion of the liquid ethylene by a device as shown in Fig. 6. This device may conveniently consist of a vessel or container 63 to which the ethylene supply pipe 33 is connected, and within which a secondary member 64 is positioned and connected at the top to the catalyst solution outlet pipe 28. The boron trifluoride pipe 32 is connected to a bubbler head 65 within the member 64. The liquid ethylene flowing from the pipe 33 flows through the member 63, through the member 64 and out the pipe 28 to the reactor and carries with it the catalyst dissolved in the liquid ethylene. Thus the diluent-refrigerant contains dissolved therein the necessary portion of catalyst for the polymerization of the isoolefin mixed with the remainder of the diluent-refrigerant. If desired, the catalyst solution may be made up in a diluent only, with the refrigerant kept separate.

Figure 1:
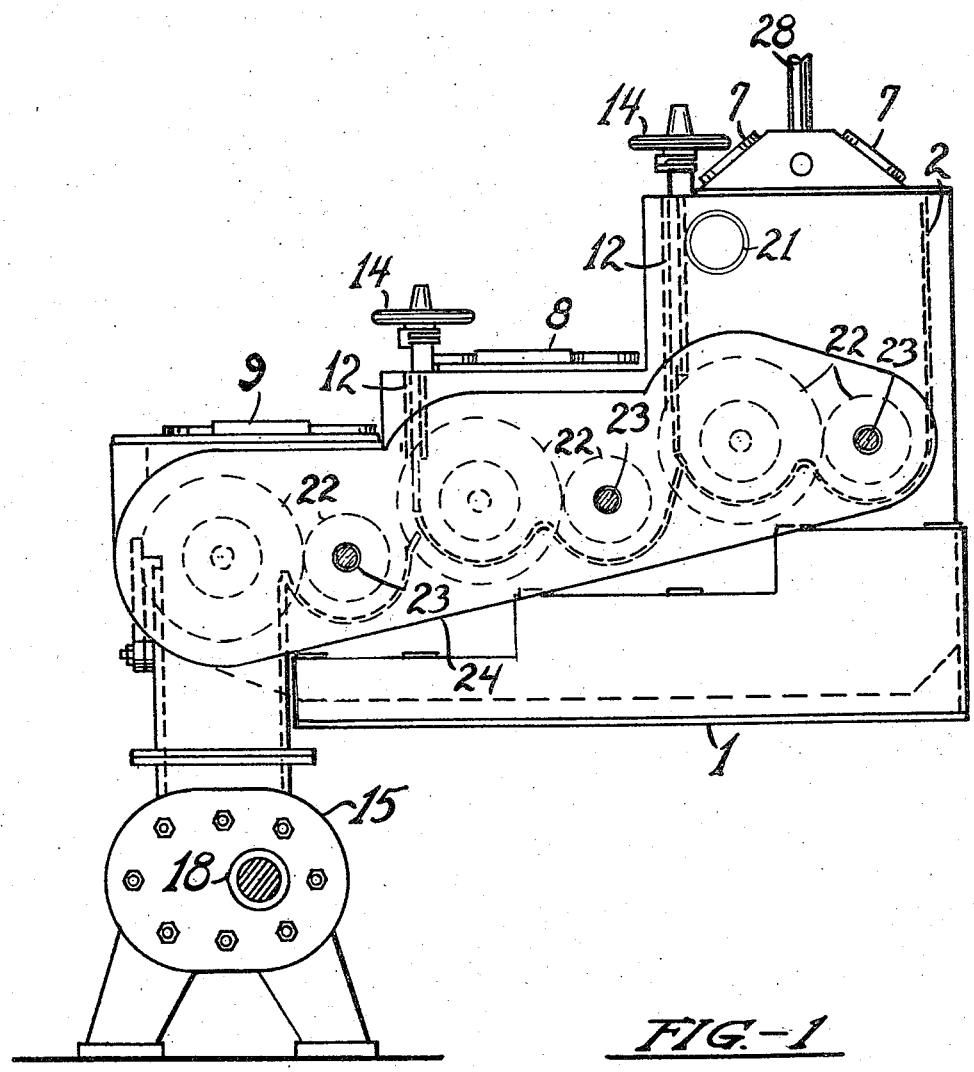

Alternatively, the respective components of the reaction mixture may be delivered separately to the reactor, the isoolefin being delivered through one supply line, the diluent-refrigerant through another and the catalyst through a third. Alternately, gaseous boron trifluoride may be delivered to the reactants in the reactor through a supply pipe 66 entering the bottom of the reactor as shown in Fig. 1. This form is satisfactory, if a sufficiently rapid stirring or agitation of the reactants is available, but in the event that the reaction mixture is only slightly stirred, this is less satisfactory than the other methods above described.

The above described embodiment utilizes a series of reactors arranged in cascade, but it is not necessary that the three be used. Equally satisfactory results, especially when the highest possible molecular weight polymer is not necessary, are obtained by the use of only two kneader members in cascade. In this embodiment, the uppermost pair of blades and container are omitted, and the cover with its sight glasses 7 and inlet pipes 28 is placed over the first one of the two kneaders.

By the device of this invention, there is thus provided a new polymerization mechanism by which the polymerization reaction is conducted in a sealed reactor from which the solid polymer is removed through an extruder which forms a solid seal of polymer to prevent the loss of gaseous or liquid portions of the reaction mixture; and the volatilized portions of the reaction mixture are recovered in a closed system and separated into pure constituents for reuse and recycling.

While there are above disclosed but a limited number of embodiments of the invention, it is possible to produce still other embodiments without departing from the inventive concept herein disclosed, and it is therefore desired that only such limitations be imposed upon the appended claims as are stated therein, or required by the prior art.

The invention claimed is:

1. Apparatus for producing solid polymers comprising a closed chamber having an inclined bottom, vertically movable imperforate gates constructed and arranged to divide said chamber into a plurality of compartments having variable areas of communication therebetween adjacent the inclined bottom, a pair of kneader blades in each compartment adjacent the inclined bottom, inlet conduits communication with that compartment having the highest portion of the inclined bottom, an outlet conduit extending from that compartment having the lowest portion of the inclined bottom to a chamber having an orifice, and an extruder worm in the last named chamber constructed and arranged to discharge solid material through said orifice.

2. Apparatus for producing solid polymers comprising a closed chamber having a stepped, inclined bottom, each step having a pair of semi-cylindrical bottom surfaces, vertically movable imperforate gates constructed and arranged to divide said chamber into a plurality of compartments having variable areas of communication therebetween adjacent the inclined bottom, a pair of kneader blades in each compartment adjacent the inclined bottom and cooperating with the semi-cylindrical surfaces therein, inlet conduits communicating with that compartment having the highest portion of the inclined bottom, an outlet conduit extending from that compartment having the lowest portion of the inclined bottom to a chamber having an orifice, and an extruder worm in the last named chamber constructed and arranged to discharge solid material through said orifice.

3. Apparatus for producing solid polymers comprising a closed chamber having an inclined bottom and a refrigerating jacket therearound, vertically movable imperforate gates constructed and arranged to divide said chamber into a plurality of compartments having variable areas of communication therebetween adjacent the inclined bottom, a pair of kneader blades in each compartment adjacent the inclined bottom, inlet conduits communicating with that compartment having the highest portion of the inclined bottom, an outlet conduit extending from that compartment having the lowest portion of the inclined bottom to a chamber having an orifice, a steam jacket therearound, and an extruder worm in the last named chamber constructed and arranged to discharge solid material through said orifice.

4. Apparatus for producing solid polymers comprising a closed chamber having a stepped, inclined bottom, each step having a pair of semi-cylindrical bottom surfaces, and a refrigerating jacket therearound, vertically movable imperforate gates constructed and arranged to divide said chamber into a plurality of compartments having variable areas of communication therebetween adjacent the inclined bottom, a pair of kneader blades in each compartment adjacent the inclined bottom and cooperating with the semi-cylindrical surfaces therein, inlet conduits communicating with that compartment having the highest portion of the inclined bottom, an outlet conduit extending from that compartment having the lowest portion of the inclined bottom to a chamber having an orifice, a steam jacket therearound, and an extruder worm in the last named chamber constructed and arranged to discharge solid material through said orifice.

5. Apparatus for producing solid polymers comprising a closed chamber having an inclined bottom and a vapor outlet at the top thereof, vertically movable imperforate gates constructed and arranged to divide said chamber into a plurality of compartments having variable areas of communication therebetween adjacent the inclined bottom, a pair of kneader blades in each compartment adjacent the inclined bottom, inlet conduits communicating with that compartment having the highest portion of the inclined bottom, and means comprising distilling and purifying devices connected between said vapor outlet and said inlet conduits, an outlet conduit extending from that compartment having the lowest portion of the inclined bottom to a chamber having an orifice, and an extruder worm in the last named chamber constructed and arranged to discharge solid material through said orifice.

6. Apparatus for producing solid polymers comprising a closed chamber having an inclined bottom, vertically movable imperforate gates constructed and arranged to divide said chamber into a plurality of compartments having variable areas of communication therebetween adjacent the inclined bottom, a pair of kneader blades in each compartment adjacent the inclined bottom, inlet conduits communicating with that compartment having the highest portion of the inclined bottom, a top outlet for the removal of volatilized material and a gas condensing, purifying and recovery means connected thereto, a second outlet conduit extending from that compartment having the lowest portion of the inclined bottom to a chamber having an orifice, and an extruder worm in the last named chamber constructed and arranged to discharge solid material through said orifice.

7. Apparatus for producing solid polymers comprising a closed chamber having an inclined bottom, vertically movable imperforate gates constructed and arranged to divide said chamber into a plurality of compartments having variable areas of communication therebetween adjacent the inclined bottom, a pair of kneader blades in each compartment adjacent the inclined bottom, individual driving motors for the respective pairs of blades, inlet conduits communicating with that compartment having the highest portion of the inclined bottom, an outlet conduit extending from that compartment having the lowest portion of the inclined bottom to a chamber having an orifice, and an extruder worm in the last named chamber constructed and arranged to discharge solid material through said orifice.

MATTHEW D. MANN, Jr.

REFERENCES CITED

The following references are of record in the file of this patent:

UNITED STATES PATENTS

| Number | Name | Date |
|---|---|---|
| 2,221,000 | Kuentzel | Nov. 12, 1940 |
| 2,204,156 | Semon | June 11, 1940 |
| 2,122,805 | Wulff | July 5, 1938 |
| 1,935,050 | Gordon | Nov. 14, 1933 |
| 2,087,788 | Thal | July 20, 1937 |
| 2,103,546 | Morrell | Dec. 28, 1937 |
| 786,125 | Hinkle | Mar. 28, 1905 |
| 506,384 | Werner | Oct. 10, 1893 |

FOREIGN PATENTS

| Number | Country | Date |
|---|---|---|
| 491,739 | Great Britain | Sept. 8, 1939 |

OTHER REFERENCES

Perry, "Chemical Engineer's Handbook," 2nd edition, pp. 1548–1550.

Badger and McCabe, "Elements of Chemical Engineering," 2nd edition, page 519.